June 14, 1938.　　　J. F. GRAUEL　　　2,120,463
RUMBLE SEAT ENCLOSURE
Filed July 30, 1937　　　3 Sheets-Sheet 1
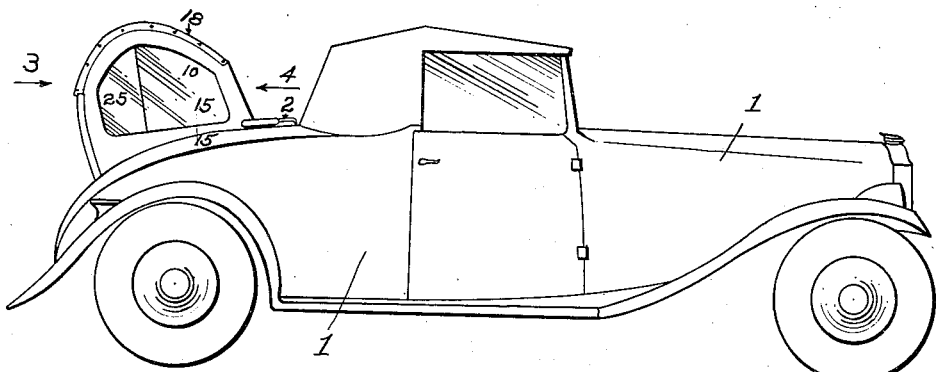
FIG. 1.
FIG. 2.
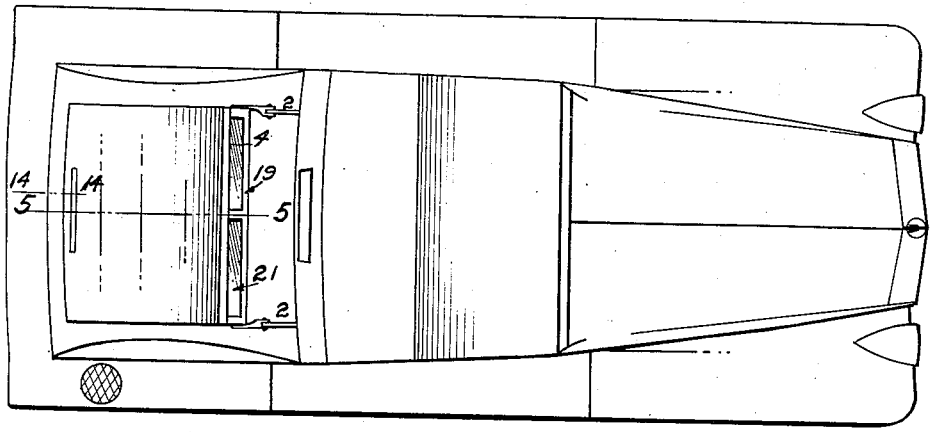
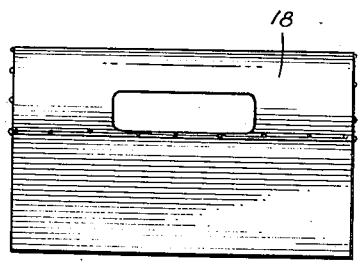
FIG. 3.
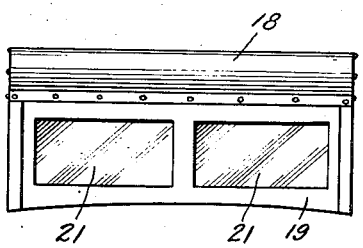
FIG. 4.
INVENTOR.
Julius F. Grauel
BY
William W. Varney
ATTORNEY.

June 14, 1938.   J. F. GRAUEL   2,120,463
RUMBLE SEAT ENCLOSURE
Filed July 30, 1937   3 Sheets-Sheet 2
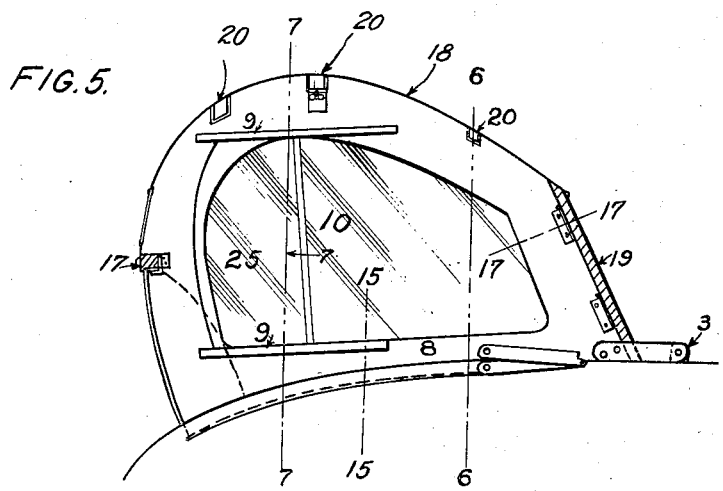
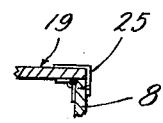
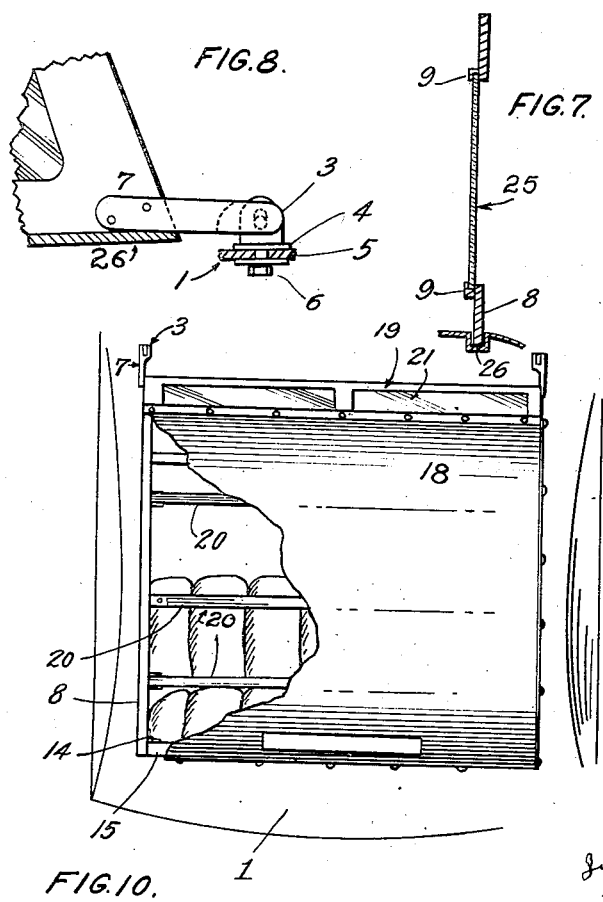
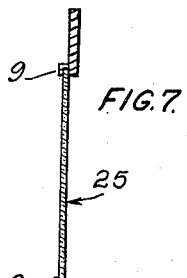
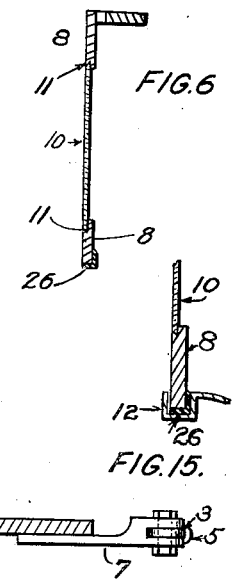
INVENTOR.
Julius F. Grauel
BY
William W. Varney
ATTORNEY.

June 14, 1938.  J. F. GRAUEL  2,120,463
RUMBLE SEAT ENCLOSURE
Filed July 30, 1937   3 Sheets-Sheet 3
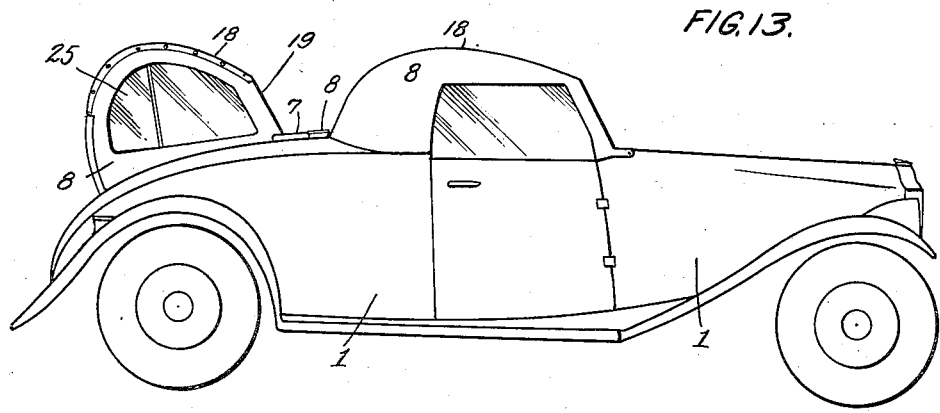
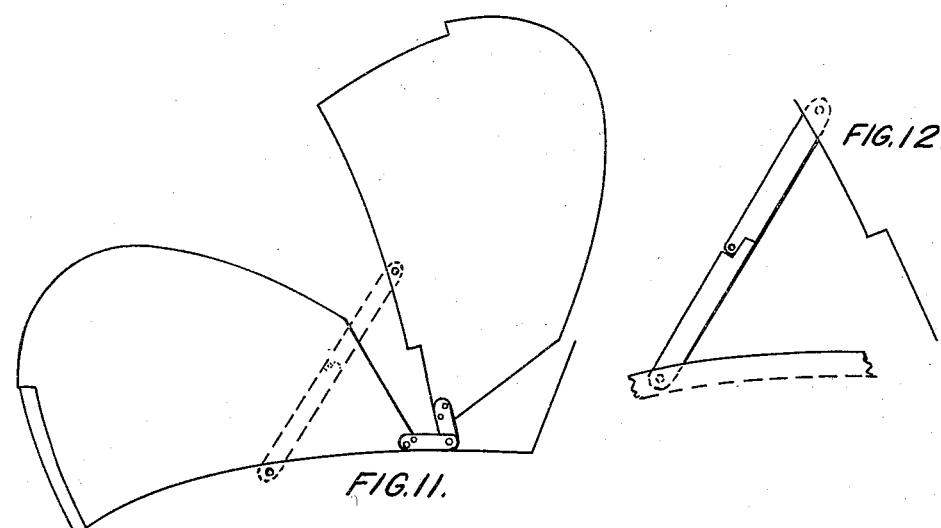
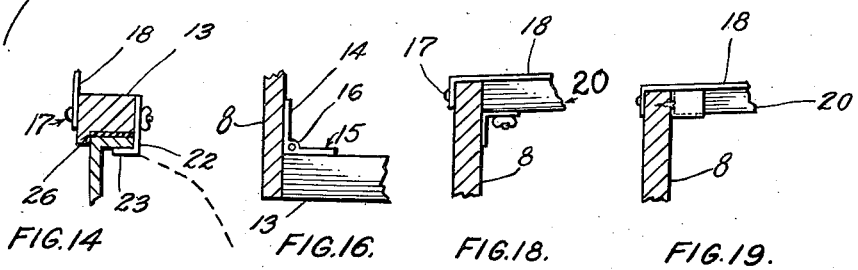
INVENTOR.
Julius F. Grauel
BY
William W. Varney
ATTORNEY.

Patented June 14, 1938

2,120,463

UNITED STATES PATENT OFFICE 2,120,463

RUMBLE SEAT ENCLOSURE

Julius F. Grauel, Baltimore, Md.

Application July 30, 1937, Serial No. 156,458

3 Claims. (Cl. 296—99)

The object of my invention is the providing a rumble seat enclosure that will actually protect the occupants thereof from all conditions of weather in rapid driving.

It has been found that curtains and side walls of a more or less flexible character are objectionable owing to the sweep of the wind around the automobile top, and to overcome this defect I have discovered that rigid side walls are almost an imperative feature of a structure of this character.

A further object of my invention is the adapting of rigid side walls in a rumble seat enclosure in a collapsible form so that the same may be easily erected, or knocked down, packed and stored.

A further object of my invention is the construction of a rumble seat enclosure which is substantially water-proof in its attachment to the automobile to prevent the entrance of undesirable moisture into the enclosure.

A further object of my invention is the construction of a canopy or top for open spaces in automobile bodies, such as the driver's pit in automobiles or cars, trucks, or the like, that may be easily dismantled and removed for transportation purposes.

A further object of my invention is an improved means for securing a unit structure on the front end so that the same may be raised from the rear in vehicles or automobiles.

A further object of my invention is an improved means for maintaining a rigid canopy in open position when hinged on the forward end so that passengers may enter or freight may be inserted from the rear.

With the foregoing and other objects in view, my invention consists of the novel construction, combination and arrangement of parts as hereinafter specifically described, and illustrated in the accompanying drawings, wherein is shown the preferred embodiment of my invention, but it is understood that changes, variations and modifications may be resorted to which come within the scope of the claims hereunto appended.

In the drawings of the herein-described embodiment of my invention, Figure 1 is a side view in elevation of a sport model automobile provided with a rumble seat and having my improved rumble seat enclosure adapted to the same; Fig. 2 is a plan view of the automobile and attached rumble seat enclosure shown in Fig. 1; Fig. 3 is a back view in elevation of the rumble seat with my improved enclosure in position thereon, looking in the direction of the arrow 3 in Fig. 1; Fig. 4 is a front view looking rearwardly in the direction of the arrow shown in Fig. 1; Fig. 5 is a sectional view in elevation of my rumble seat enclosure, taken through 5—5 of Fig. 2; Fig. 6 is a sectional view taken through 6—6 of Fig. 5; Fig. 7 is a sectional view taken through 7—7 of Fig. 5, looking in the direction of arrow 7; Fig. 8 is an enlarged view of the hinge secured to my rumble seat enclosure; Fig. 9 being a plan view of the same; Fig. 10 is an enlarged plan view in detail of the top of my rumble seat enclosure with a portion of the covering removed therefrom; Fig. 11 is a view in elevation showing the position of my rumble seat enclosure when open or lifted up for the admission of passengers; Fig. 12 is an enlarged view of the strut for holding the enclosure in upright or open position as shown in Fig. 11; Fig. 13 is a view in elevation of an automobile showing a modification of my rumble seat enclosure applied to the automobile as a top and wind-shield; Fig. 14 is an enlarged view, taken through 14—14 of Fig. 2, a view somewhat similar to that shown in Fig. 5, particularly showing the connection of my enclosure to the top of the rumble seat to make the same water-tight. Fig. 15 is a view taken through 15—15 of Figs. 1 and 5, showing particularly the method of making my enclosure tight on the sides in the vicinity of the channel.

Fig. 16 is an enlarged view of hinge 16 for securing the side wall to the cross-sill; Fig. 17 is an enlarged view showing the method of securing the side wall 8 to wind-shield 19; Fig. 18 is an enlarged view showing the method of securing cross-rib 20 to side wall 8, especially the center one which preferably is the one secured; Fig. 19 is a similar view, showing the stirrup in which ribs 20 are supported without being secured, the same being held in place by the flexible top when stretched.

Similar numerals refer to similar parts throughout the several views.

I is the conventional type of automobile particularly adapted for my improved rumble seat enclosure. I wish it understood that this rumble seat enclosure may be used on any make of machine and for any space in the machine desired to be enclosed or protected from the air or moisture. My enclosure may also be used as an automobile top. This form is shown in Fig. 13 as a modification, and is especially desirable where a collapsible top is required. In the view shown the glass, or other transparent substance, recedes into a pocket in the door and fits into a miter in my enclosure, the side wall around the same being stiff and represented as 8¹; the hinge is on the front end, and all numerals pertaining to this modification being marked prime and representing similar parts to the other views shown. This form is especially useful in transportation where a knock-down condition is required for shipping.

Referring to Fig. 1, 2 is a handle in the vicinity of the rumble seat, provided by the manufacturer, and which I have found very convenient to utilize as one portion of my hinge for securing my enclosure. If a suitable handle is not provided, I provide a hinge body 3, as shown in Figs. 5 and 8. This feature, as shown in Fig. 8, is provided with clamping surfaces 4 and 5 for clamping the automobile body, and is secured by clamping nut 6. Attached to this particular member, 2 or 3, is a conjugate member 7 (see Fig. 8) which is secured to my enclosure by any suitable means, such as screws, bolts or rivets, thereby forming a hinge upon which the enclosure may swing. Members 3 and 7 are connected by a pin, bolt or other suitable means to form a hinge.

I might state here that my rumble seat enclosure when assembled as a unit is easily detached or removed from the automobile by simply disengaging the hinges on the forward lower edge of the wind-shield; this also applies to the enclosure when used as an automobile top. I would call attention to the fact that when it is used in the latter connection the enclosure is hinged from the forward end, an unusual and unique feature.

Side wall construction 8 is the side wall, and as shown in Fig. 5 is of one piece construction and may be made of wood, paper, or metal. When I say one piece construction I mean it is a rigid structure, not that it is made of a single piece of material. In this structure 8 are window strips 9 (see Figs. 5 and 8). In side wall structure 8 is secured preferably permanently transparent section of glass 10 by means of a groove or channel 11 (see Fig. 6), or other suitable means. The lower portion of side wall 8 is made to fit the contour of the body of the automobile and is faced with a gasket or soft packing 26 to make a water-tight job. This fits into groove or channel 12 (see Fig. 15). I might state here that all portions of my enclosure body are preferably faced with a flexible or soft packing 26, such as rubber or felt, and the same may be attached by cement or any well-known mechanical means.

13 is a cross-sill fitted to the top of the rumble seat, forming a capping or overlapping of the same on the exterior portion to make a water-tight job (see Figs. 5 and 14). This also is lined with a resilient packing. Cross-sill 13 is secured to side wall 8 by any well-known means, such as a removable pin hinge as shown in Fig. 16, marked 14 and 15, held together by pin 16. On the exterior of cross-sill 13 are securing means 17 for flexible top 18 which is secured to the exterior of cross-sill 13 and to the top edge of side wall 8 and to the top forward side of wind-shield 19 and extends over ribs 20. Ribs 20 are secured to side walls 8 as may be desired. I have found it sufficient to secure one, preferably the center one, by means of a thumb-screw clamp as shown particularly in Fig. 18.

In wind-shield frame 19 is set a transparency of glass 21 in a manner similar to that described for the glass in the side walls, Fig. 6. The bottom edge of wind-shield frame 19 fits the contour of the automobile and is also lined with a resilient or soft packing to make a water-tight fit. Wind-shield frame 19 is secured to the side walls 8 by hinge and loose pin construction (see Fig. 17). The outside edge of the side walls in contact with the wind-shield frame may be provided with a polished angle-iron covering 25, if desired, secured by means of bolts or screws to the wind-shield and into the bosom of which the side walls fit (see Fig. 17).

Flexible top 18 is made of any suitable covering material as used in top construction work, and is provided with means on the edges for the attaching elements to the side walls, wind-shield and sill. The wind-shield, as suggested above, is provided with a polished channel on its side edges in the bosom of which the side walls fit; this polished channel 25 acts as a stiffening member.

I have shown in the several figures a sliding window 25 in each of the sides to work in conjunction with glass 10, said window sliding in groove 9 (see Figs. 5 and 7).

The operation of my invention is as follows:

The rumble seat enclosure being assembled as heretofore described and hinged as shown, may be lifted from the rear and held in position by the strut, in this position affording easy, safe and convenient means for entering and leaving the rumble seat. When it is desired to lower the rumble seat the strut is released, which permits the entire enclosure to rest on the back of the rumble seat and in the channel. When in this position the enclosure may be secured by means of securing clamp 22 (see Fig. 14) which consists of hook member 23 and thumb-screw 24. Reversing the operation of assembly, my enclosure may be collapsed, the side walls brought together, the ribs and covering assembled in a compact bundle and the whole stored within the rumble seat.

Referring to Fig. 13, where my invention is used as an automobile top for the driver's seat, the construction is practically the same as that shown in detail above and is used in a similar manner, the top being raised and hinged at the forward end and the glass being lowered in the door, if desired, though not necessary.

It will be noted that the door glass is so shaped that the top may be raised while the glass is up in position closed; in other words, the door may be opened and shut with my enclosure down in place. This, however, is a minor feature, as the glass in the side walls may be as shown in Fig. 5, or any desirable means for securing a transparency. I claim nothing concerning this window or window construction, excepting the adaptation of the door-glass to my enclosure.

It will also be noted that the rear of my enclosure in this modification contacts with the body of the automobile instead of the back of the rumble seat.

Having thus described my invention, what I claim and desire to secure by Letters Patent is:

1. In an automobile having a top and provided with a body and an open space behind said top in said body, a hood protecting said space consisting of a unitary windshield and rigid side wall structure and a readily detachable flexible top, rigid means for maintaining said hood in a rigid structure, said hood being provided with means for contacting the automobile body and means for securing the forward edge of the hood to the automobile to form a hinge whereby the hood may be raised from the rear to permit access to said space.

2. In an automobile having a top and provided with a body and an open space behind said top in said body, said space on the forward edge being provided with a gutter, a hood protecting said space consisting of a unitary windshield and rigid side wall structure and a readily detachable flexible top, rigid means for maintaining said hood in a rigid structure, said hood being provided with means for contacting the automobile body and means for securing the forward edge of the hood to the automobile consisting of contacting said hood on said body forward of said opening and said gutter, thus leaving a portion of said body within said hood, to form a hinge, whereby the hood may be raised from the rear to permit access to said space.

3. In an automobile having a top and provided with a body, an open space behind said top in said body, a seat within said space the back of which extends above said body, a hood protecting said space and said seat consisting of unitary windshield and rigid side wall structure and a readily detachable flexible top, rigid means for maintaining said hood in a rigid structure, means extending between the side walls of said hood in the rear to fit the back of said seat to form a joint, said hood being provided with means for contacting the automobile body, means for securing the forward edge of the hood to the automobile to form a hinge whereby the hood may be raised from the rear to permit access to said space.

JULIUS F. GRAUEL.